United States Patent [19]
Aramaki et al.

[11] 3,907,685
[45] Sept. 23, 1975

[54] BELT DEVICE FOR COLLECTING FLOATING MATTER FROM WATER SURFACE

[75] Inventors: Kuninori Aramaki, Yokohama; Hiroshi Kawakami, Kamakura; Masao Suzuki, all of Japan

[73] Assignee: Bridgestone Tire Company Limited, Tokyo, Japan

[22] Filed: July 8, 1974

[21] Appl. No.: 486,723

[30] Foreign Application Priority Data
July 10, 1973  Japan.......................... 48-81597[U]

[52] U.S. Cl.......... 210/242; 210/DIG. 21; 210/400; 210/526
[51] Int. Cl.²....................................... E02B 15/04
[58] Field of Search............ 210/83, 242, 400, 401, 210/526, DIG. 21

[56] References Cited
UNITED STATES PATENTS

| 3,096,279 | 7/1963 | Komline | 210/401 X |
|---|---|---|---|
| 3,227,281 | 1/1966 | Peterson et al. | 210/401 X |
| 3,314,540 | 4/1967 | Lane | 210/400 X |
| 3,508,663 | 4/1970 | Brill | 210/400 |
| 3,637,080 | 1/1972 | Markel | 210/242 |
| 3,695,451 | 10/1972 | Schmidt, Jr. et al. | 210/400 |
| 3,800,951 | 4/1974 | Moyrlon et al. | 210/242 |
| 3,804,251 | 4/1974 | Farrell et al. | 210/242 |
| 3,812,968 | 5/1974 | Aramaki et al. | 210/242 |

*Primary Examiner*—Theodore A. Granger
*Attorney, Agent, or Firm*—Sughrue, Rothwell, Mion, Zinn & Macpeak

[57] ABSTRACT

A belt device for collecting floating matter from a water surface comprising a pair of pulleys, one of which being arranged above the water surface and the other pulley being arranged below the water surface, and an endless belt loosely engaged with the pulleys and having a lower loosening portion inclined from a relative direction of water flow by an acute angle.

9 Claims, 15 Drawing Figures

FIG_1
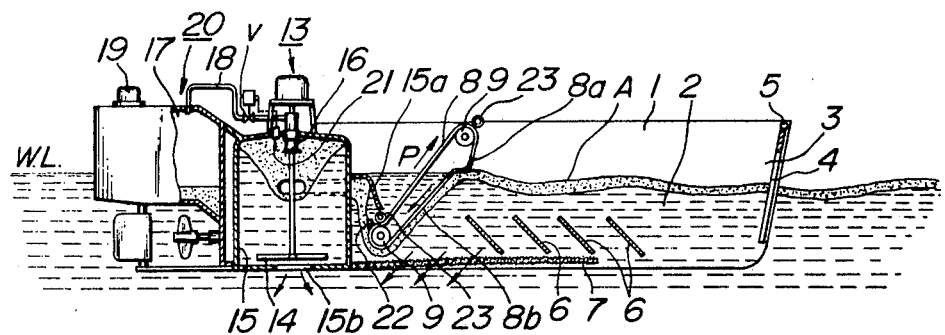
FIG_2
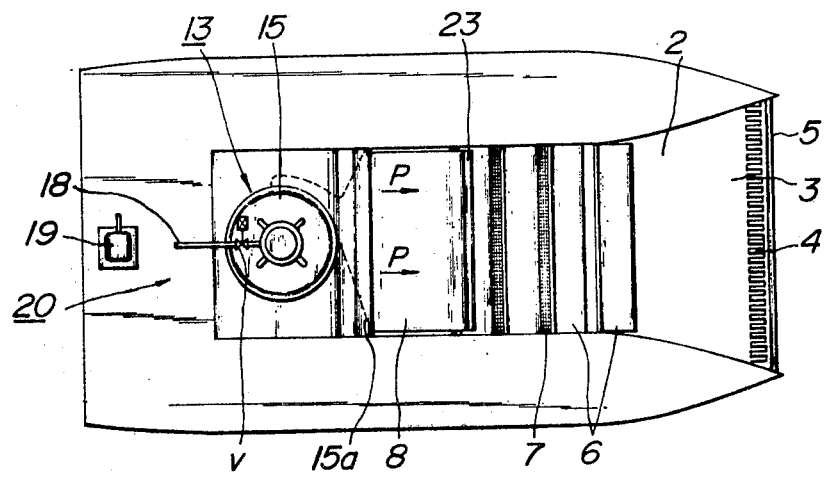

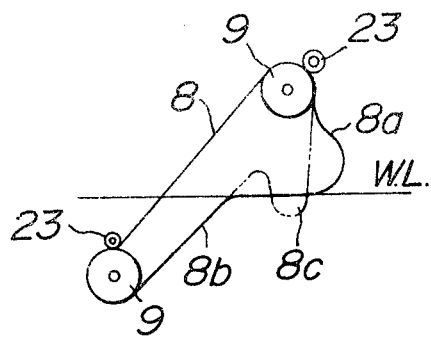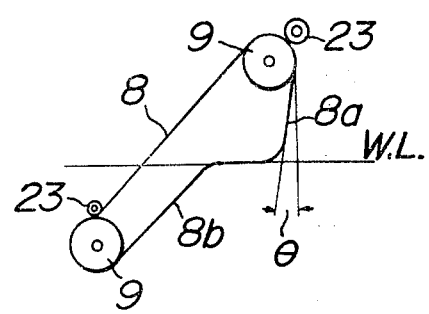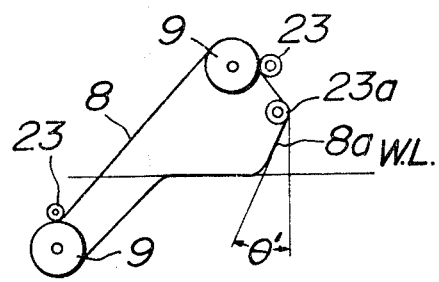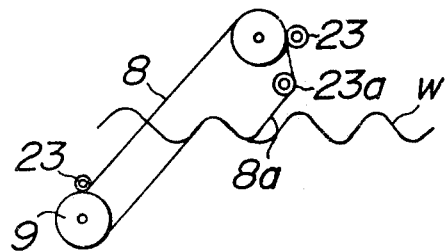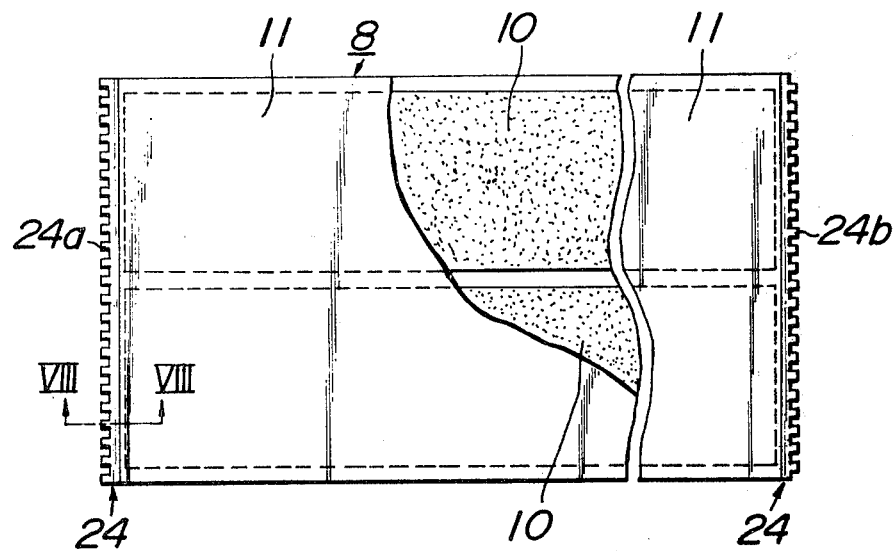

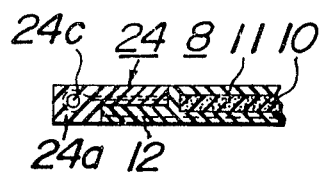
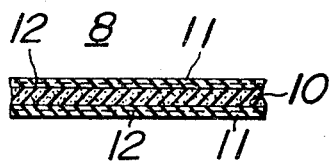
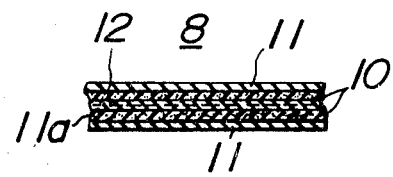
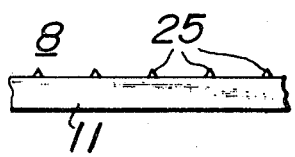
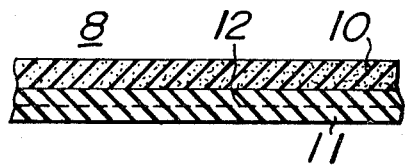
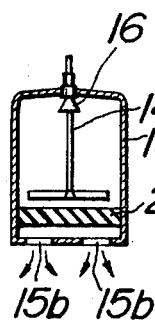
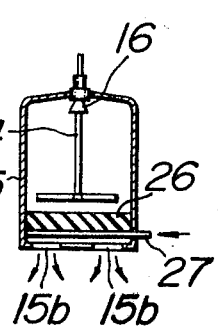
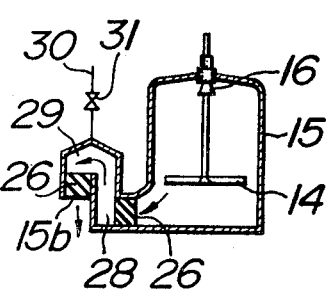

BELT DEVICE FOR COLLECTING FLOATING MATTER FROM WATER SURFACE

The present invention relates to an improvement of a belt device for collecting floating matter from water surface for use in the recovery of petroleum or the like which is leaked from a tanker or a ship onto water surface.

In order to collect floating matter from water surface, there has hitherto been used a belt device comprising a pair of pulleys and an endless belt closely engaged therewith. In this device, one of the pulleys is arranged above water level and the other plurality is arranged below water level, whereby the endless belt is circularly driven above and below the water level. Thus, the floating matter is made into contact with and pulled by the lower travelling portion of the belt into the water. Then, the floating matter is turned upwardly in a floating direction around the pulley arranged below the water level and fed into a separator tank having a socket opened below the water level, where the floating matter having a low water content is recovered by a gravity separation. However, the conventional belt device has a drawback that when a wave or strong water flow strikes to the surface of the endless belt, the wave is rebounded to form splashes so that the floating matter is scattered and it is difficult to collect the scattered floating matter.

An object of the present invention is to eliminate the above drawback and to provide a belt device for collecting floating matter from water surface wherein a rate of collecting the floating matter is considerably improved.

That is, the present invention consists in a belt device for collecting floating matter from water surface comprising a pair of pulleys, one of which being arranged above the water surface and the other pulley being arranged below the water surface, and an endless belt loosely engaged with said pulleys and having a lower loosening portion inclined from a relative direction of water flow by an acute angle.

According to the present invention, the circumferential length of the endless belt is so long that the belt loosely engages with the pair of pulleys. The circumferential speed of the pulley arranged above the water surface is made large as compared with that of the pulley arranged below the water surface, whereby the lower loosening belt portion can be formed. In this case, however, the contact area of the belt to the pulley is apt to be small, so that it is preferable to use a touch roller auxiliarily.

The lower loosening portion of the endless belt is subjected to buoyancy below the surface of the water and pushed by the water flow directed toward the belt, so that the part of the belt positioned near the water surface becomes inclined from the water surface by a smaller angle. As a result, the lower loosening portion is liable to get intimate with the surface of the layer-like floating matter and smoothly pull the floating matter into the water without difficulty and further flexibly adapts to waves or strong water flow directed toward the belt, so that excessive collision and interference to the belt is not caused. Therefore, the floating matter can be accurately collected.

In order to ensure the floatability of the endless belt, it is preferable that the specific gravity of the belt is smaller than that of water. To this end, the endless belt has a total apparent specific gravity of not more than 1 and is prepared, for example, by covering a belt-shaped and closed-cell flexible foamed body with a rubbery elastomer including at least one reinforcing layer therein. Thus, the loosening portion of the belt forms a considerably wide contact area with the floating matter along the water surface, so that the action of pulling the floating matter into the water, that is, the collecting action is further ensured.

The invention will now be described with reference to the accompanying drawings, wherein:

FIG. 1 is a vertical sectional view of a ship provided with a belt device for collecting floating matter from water surface according to the present invention;

FIG. 2 is a schematic plan view of the ship of FIG. 1;

FIGS. 3 to 6 are schematic views illustrating the operation of the belt device according to the present invention, respectively;

FIG. 7 is a plan view of a belt in its developed state according to the present invention, partly in section and broken away;

FIG. 8 is a sectional view of the belt taken along line VIII—VIII of FIG. 7, in enlarged state;

FIGS. 9, 10 and 12 are partial sectional views of another embodiments of the belt according to the present invention, respectively;

FIG. 11 is a partial side view of a further embodiment of the belt according to the present invention; and FIGS. 13 to 15 are schematic sectional views of embodiments of a separator tank mounted on the ship of FIG. 1, respectively.

Like parts are designated by like numerals and like symbols throughout the different figures of the drawing.

The present invention will be explained with respect to a ship for recovering petroleum leaked into water surface.

Referring to FIGS. 1 and 2, a belt device according to the present invention constitutes a part of a system for recovering floating matter from water surface and hence is mounted on a ship 1. The ship 1 is provided at its central part with a water passage 2 so as to cause a water flow into the ship 1 as the latter cruises on the water surface. In other words, the ship 1 is made opened in a substantial U-shaped ahead as viewed in FIG. 2.

The water passage 2 is provided at the leading end of the ship 1 with an inlet opening 3 so as to guide the water flow into the passage 2 when the ship 1 cruises. The inlet opening 3 is provided with a screen 4 for preventing foreign matter from entering the passage 2 together with the floating matter A such as drifted petroleum and the like, which is accidentally leaked from a tanker onto the water surface.

In the embodiment of FIGS. 1 and 2, the screen 4 is of comb type and is pivotably mounted at its upper end on a horizontal shaft 5. Thus, when the ship 1 is not operating for recovery of the floating matter A, for example, in a normal cruising, the screen 4 can be held above the water surface. In the passage 2 behind the opening 3 are arranged a plurality of anti-reverse-flow boards 6 each inclined from a bow direction by an acute angle, whereby the water and floating matter A in the passage 2 are so controlled that they are not reversed in direction and prevented from becoming influenced by waves when the ship 1 is moving forward. As a result, the water and floating matter A can be introduced into the belt device according to the present invention as will be described below.

At the bottom of the passage 2 below the anti-reverse-flow boards 6 is disposed wave-suppressing filter 7 which serves not only to prevent the floating matter A from leaking to the outside of the ship 1 through the bottom thereof due to water turbulence not eliminated by the anti-reverse-flow boards 6, but also to discharge an excess amount of water outside the ship 1.

That is, the wave-suppressing filter 7 together with the anti-reverse-flow boards 6 play a role of increasing a thickness of the layer of the floating matter A near the front of the belt device as will be described below.

The belt device for collecting the floating matter A comprises an endless belt 8 having the same width as that of the passage 2, and a pair of pulleys 9. The endless belt 8 is driven in a direction shown by an arrow P of FIGS. 1 and 2 by means of a suitable driving means (not shown). One of the pulleys 9 is arranged above the water surface and the other pulley is arranged below the water surface, an axis extending through the centers of both pulleys being inclined from a relative direction of water flow in the passage 2 by an acute angle. The endless belt 8 has such a circumferential length that the belt loosely engages with the pulleys 9. By making the circumferential speed of the pulley arranged above the water surface large as compared with that of the pulley arranged below the water surface, a loosening portion 8a can be formed in the lower travelling side of the belt which is guided into the water, and as a result, that part of the belt which is positioned near the water surface becomes inclined from the water surface by a smaller angle. This tendency can be promoted by using a belt material having an apparent specific gravity smaller than the specific gravity of the water, preferably having an apparent specific gravity of not more than about 0.7 which is smaller than a specific gravity of light oils.

As seen from FIG. 1, the loosening portion 8a collects a large amount of the floating matter A over a wide area on the water surface during the moving of the belt 8, so that the contact area of the belt 8 with the floating matter A becomes larger.

Moreover, in order to ensure the contacting of the belt 8 with the pulleys 9, it is preferable to auxiliarily use a pair of touch rollers 23 which serve to adjust the length of the loosening portion 8a of the belt.

As shown in FIGS. 3, if the loosening portion 8a of the belt is too large, the portion 8a becomes moved forwardly and then is forced inwardly by collision with a high wave, so that the movement of the floating matter becomes unstable. That is, the water penetrates into the back side of the portion 8a of the belt 8 and the portion 8a is not maintained in a floating state on the water level (W.L.) as shown by a full line in FIG. 3 and is shifted to the position (8c) as shown in dot and dash lines.

The loosening portion 8a is most preferable to be positioned in a state which is taken when water is calm as shown in FIG. 4. That is, an angle ($\theta$) made between the loosening portion 8a and a tangential line from the upper pulley 9 directed perpendicular to the water surface W.L. must approximately satisfy the following equation:

$$5° < \theta < 35°$$

This value of the angle $\theta$ was confirmed by experiments.

In FIG. 5, provision is made of a roller 23a for adjusting the length of the loosening portion 8a. The position of the roller 23a may be adjusted, for example, in This and backward directions or upward and downward directions for adjusting the length of the loosening portion 8a in accordance with undulations of wave. In this case, the loosening portion 8a is most preferable to be such a state in calm water that an angle ($\theta'$) made between the portion 8a and a tangential line from the roller 23a directed perpendicular to the water surface W.L. must approximately satisfy the following equation:

$$5° < \theta' < 35°$$

This value of the angle $\theta'$ was also confirmed by experiments. When waves $w$ are present, it is desirable that the loosening portion 8a has a length which is sufficient enough to cover at least one wave top as shown in FIG. 6.

The structure of the belt 8 will now be described below with reference to FIGS. 7 to 12.

Referring to FIGS. 7 and 8, reference numeral 10 represents a belt-shaped spongy rubber or other closed-cell flexible foamed body having a specific gravity considerably smaller than 1. The overall surface of the foamed body 10 is covered with a polychloroprene or other rubbery elastomer 11 to form a belt. A reinforcing layer 12 such as canvas, cord fabric and the like is embedded in the rubbery elastomer 11 substantially all over thereof. It is preferable to arrange the cord fabric in such a manner that the cord unit is perpendicular to a longitudinal direction of the belt, because such arrangement ensures a flexibility of the overall belt. To both ends of the belt are secured a pair of fitting members 24, made of polychloroprene or other rubbery elastomer. Each of the fitting members 24, 24 has a plurality of comb-teeth shaped parts 24a, 24b, these parts being complementarily fitted with each other. Furthermore, aligning holes 24c are extended through the parts 24a, 24b along the width direction of the fitting member 24. The projected parts 24a are fitted into the recessed parts 24b to form a joint, through the aligning hole 24c of which is extended a wire material such as steel wire or the like (not shown) to form an endless belt 8. The belt of the above described structure has an apparent specific gravity of not more than 1 so that it can float on the water surface.

FIGS. 9 to 12 show another embodiments of the belt to be used in the present invention, respectively.

In the embodiment of FIG. 9, the reinforcing layers 12 are embedded in the upper and lower rubbery elastomer layers 11, 11 respectively. In the embodiment of FIG. 10, an intermediate layer 11a of a rubbery elastomer is sandwiched between two layers 10, 10 of the closed-cell flexible foamed body and further the layers 10, 10 are covered with the rubbery elastomer layers 11, 11 reinforcing layer 12 being embedded in the intermediate layer 11a.

In the embodiment of FIG. 11, a plurality of fins 25 are provided on the surface of the belt in the width direction thereof and made integral with the rubbery elastomer layer 11. These fins 25 effectively serve to improve the pulling of the floating matter A into the water when using as the endless belt 8 for collecting the floating matter.

These belts 8 shown in FIGS. 7 to 11 can prevent the increase of the apparent specific gravity due to the penetration of water because the flexible foamed body 10 as a floating means has closed-cells and is covered with the rubbery elastomers 11. As a result, they are particularly useful to the belt device for collecting floating matter from water surface according to the invention. Furthermore, the rubbery elastomer 11 and the reinforcing layer 12 embedded therein give a sufficient strength to the belt as the whole and improve the durability thereof.

In the embodiment of FIG. 12, the belt 8 is formed by embedding the reinforcing layer 12 such as canvas or the like in the main belt-shaped rubber layer 11 and adhering to the surface of the main layer 11 a closed-cell foamed body layer 10 which serves to lower the apparent specific gravity as a whole. In this case, the strength of the belt is given by the main layer 11. Of course, the whole of the belt 8 may also be integrally formed by the same light materials.

As shown in FIG. 1, the endless belt 8 is driven by the pulleys 9, through the touch rollers 23, which serve to make the contact area of the belt with the pulley large and to reduce a slipping of the belt.

When floating matter A such as petroleum or the like arrives at the loosening portion 8a of the endless belt 8 it is sandwiched between the loosening portion 8a and the water surface and then is pulled downwardly into the water along a portion 8b of the belt 8. After the belt 8 is turned upwardly around the pulley 9 arranged below the water surface, the floating matter A is separated from the belt 8 by means of a wiper 22 and fed into a separating device 13 located at the rear portion of the water passage 2 together with the water accompanied by the floating matter A through a socket 15a while floating upwardly. In the separating device 13, the floating matter A is subjected to a gravity separation to reduce the water content thereof and finally recovered The separating device 13 shown in FIG. 1 is a downwardly-directed whirl generating bucket 15 having a propeller 14, a socket 15a and a suction nozzle 16. In the bucket 11, whirl is produced by the rotation of the propeller 14, whereby the floating matter A is separated from the water due to the difference of the specific gravity between both the substances. The water is discharged through a bottom opening 15b of the bucket 15, while the floating matter A collected in the upper portion of the bucket 15 is successively transported into a storage tank 17 through a conduit 18 by means of the suction nozzle 16. Referring to FIG. 1, reference numeral 19 represents a vacuum pump and reference numeral 20 represents a suction means consisting of the storage tank 17, the conduit 18 and the vacuum pump 19. Moreover, on the conduit 18 may be mounted a solenoid valve v controlled by a detecting means 21 so as not to operate the suction means 20 when the bucket 15 is filled with sea water or the like.

In some cases, the water discharged from the bottom opening 15b of the bucket 15 may contain a very small amount of oils. FIGS. 13 to 15 show embodiments of the downwardly directed bucket 15 including an adsorptive layer 26 therein so as to substantially completely prevent the escaping of the oil content from the bucket 15 with the discharge of the water. By the adsorptive layer 26, the oil content fed in the bucket 15 can be recovered completely.

In the embodiments of FIGS. 13 and 14, the adsorptive layer 26 is arranged in the bucket 15 above the bottom opening 15b. In this case, when the excess water containing oil drops, after the separation, is passed through the adsorptive layer 26, the oils are left in the layer 26 and accumulated into a large oil drop. Then, the resulting oil drop again floats due to the fact that the buoyancy of the oil drop overcomes the flowing force of the discharge water and is mixed with the floating matter A collected in the upper portion of the bucket 15. Therefore, the floating matter A such as oils or the like cannot escape together with the discharged water.

In the embodiment of FIG. 14, below the adsorptive layer 26 is arranged an air-blowing pipe 27 having a plurality of apertures, whereby the oils adhered to the layer 26 are rendered to float with bubbles.

In the embodiment of FIG. 15, at the rear of the bucket 15 is arranged a drain passage 28 communicating with the bottom opening 15b and two-stage adsorptive layers 26 are arranged in the passage 28. The floating matter A adhered to the first-stage adsorptive layer floats in the form of large oil drops into the upper portion of the bucket 15 and is recovered in the storage tank 17 through the suction nozzle 16 like the aforesaid embodiment. Furthermore, the floating matter A adhered to the second-stage adsorptive layer is collected in the form of large oil drops into an auxiliary separating means 29 arranged at the intermediate portion of the passage 28 and above the adsorptive layer 26. The floating matter A collected in the auxiliary separating means 29 is fed into the storage tank 17 by opening a valve 31 through a conduit 30 communicating the auxiliary separating means 29 with the storage tank 17.

As mentioned above, in the belt device for collecting floating matter from water surface according to the present invention, the loosening portion 8a of the belt 8 is considerably adapted to waves or strong water flow owing to its flexibility and forms a wide contact area with the floating matter A along the water surface. Therefore, the scattering of the floating matter A by collision on the belt is not only mitigated, but also the floating matter is pulled into the water without difficulty because the loosening portion 8a of the belt 8 is moved along the water surface. As a result, the floating matter A such as petroleum or the like arrived at the belt can be accurately collected in a high yield.

What is claimed is:

1. Apparatus for collecting materials from the surface of a body of water, said apparatus comprising:
   a floating vessel supporting an endless belt constructed and arranged on said vessel so that an upper roller of said endless belt is above the surface of said body of water and the lower roller of said belt is beneath the surface of said body of water, said endless belt having an upper run and a lower run,
   drive means for said endless belt comprising drive rollers pressing the surface of said belt against the upper and lower rollers to retain said endless belt on its lower roller and to drive the upper run of said belt over the upper roller, whereby the lower run of said belt is substantially longer than the distance between said upper and lower rollers.

2. A belt device as claimed in claim 1, wherein an angle ($\theta$) made between said lower run and a tangential line from the upper roller directed perpendicular to the water surface satisfy the following equation:

$$5° < \theta < 35°$$

3. A belt device as claimed in claim 1, wherein said endless belt has a total apparent specific gravity smaller than the specific gravity of water.

4. A belt device as claimed in claim 3, wherein said apparent specific gravity is not more than 1.

5. A belt device as claimed in claim 3, wherein said apparent specific gravity is not more than 0.7 which is less than the specific gravity of light oil.

6. A belt device as claimed in claim 1, wherein said belt is formed by covering a belt-shaped and closed-cell flexible foamed body with a rubbery elastomer layer including at least one reinforcing layer therein.

7. A belt device as claimed in claim 6, wherein said belt is formed by providing a plurality of fins on the outer surface of the rubbery elastomer layer in the width direction thereof.

8. A belt device as claimed in claim 1, wherein said belt is formed by sandwiching an intermediate rubbery elastomer layer including a reinforcing layer therein between two closed-cell flexible foamed body layers and covering the latter layers with rubbery elastomer layers.

9. A belt device as claimed in claim 1, wherein said belt is formed by embedding a reinforcing layer in a main belt-shaped rubber layer and adhering a closed-cell flexible foamed body layer to the surface of said main layer.

* * * * *